United States Patent
Peach et al.

(10) Patent No.: US 7,231,065 B2
(45) Date of Patent: Jun. 12, 2007

(54) METHOD AND APPARATUS FOR CONTROLLING CAMERAS AND PERFORMING OPTICAL CHARACTER RECOGNITION OF CONTAINER CODE AND CHASSIS CODE

(75) Inventors: Christopher S. Peach, El Sobrante, CA (US); Xiaoguang Feng, Alameda, CA (US); Vishal M. Desai, Alameda, CA (US)

(73) Assignee: Embarcadero Systems Corporation, Alameda, CA (US)

(*) Notice: Subject to any disclaimer, the term of this patent is extended or adjusted under 35 U.S.C. 154(b) by 380 days.

(21) Appl. No.: 10/801,245

(22) Filed: Mar. 15, 2004

(65) Prior Publication Data
US 2005/0201592 A1    Sep. 15, 2005

(51) Int. Cl.
*G06K 9/00* (2006.01)
(52) U.S. Cl. .......................... 382/104; 396/58; 396/153
(58) Field of Classification Search ........ 382/104–105; 396/58, 153, 427
See application file for complete search history.

(56) References Cited

U.S. PATENT DOCUMENTS

| | | | | |
|---|---|---|---|---|
| 4,918,473 A | * | 4/1990 | Blackshear | 396/427 |
| 5,467,127 A | * | 11/1995 | Jong-Pil | 348/169 |
| 6,011,925 A | * | 1/2000 | Hosoe | 396/50 |
| 2003/0190057 A1 | * | 10/2003 | Takehara et al. | 382/104 |
| 2004/0113783 A1 | * | 6/2004 | Yagesh | 340/568.1 |

FOREIGN PATENT DOCUMENTS

EP    0594061 A2 *    4/1994

* cited by examiner

*Primary Examiner*—Matthew C. Bella
*Assistant Examiner*—Tom Y. Lu
(74) *Attorney, Agent, or Firm*—Gibson, Dunn & Crutcher, LLP; Peter F. Weinberg

(57) ABSTRACT

A method and apparatus for controlling cameras and performing Optical Character Recognition (OCR) of a container code and a chassis code on a containers and a chassis associated with a truck has at least one camera capable of viewing the truck as it passes the camera. When the truck passes the camera, which the camera may determine when it is in a first viewing position, and the truck stops, which may be determined by the camera when it is in a second viewing position, the camera views the truck and determines if it has a chassis and container, and if so, what is the container size. The camera then pans to another viewing position depending on container size, and images a container code. Another camera may determine chassis code.

19 Claims, 20 Drawing Sheets

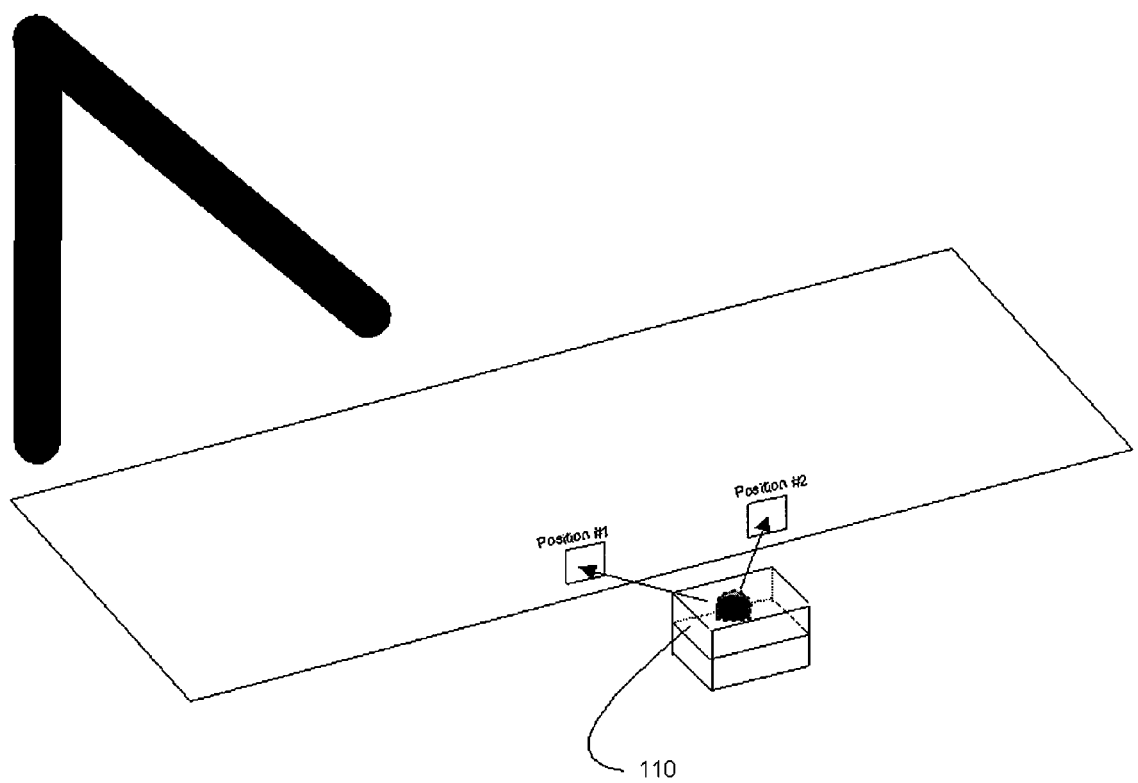

Lane Server - 2 Lane Configuration

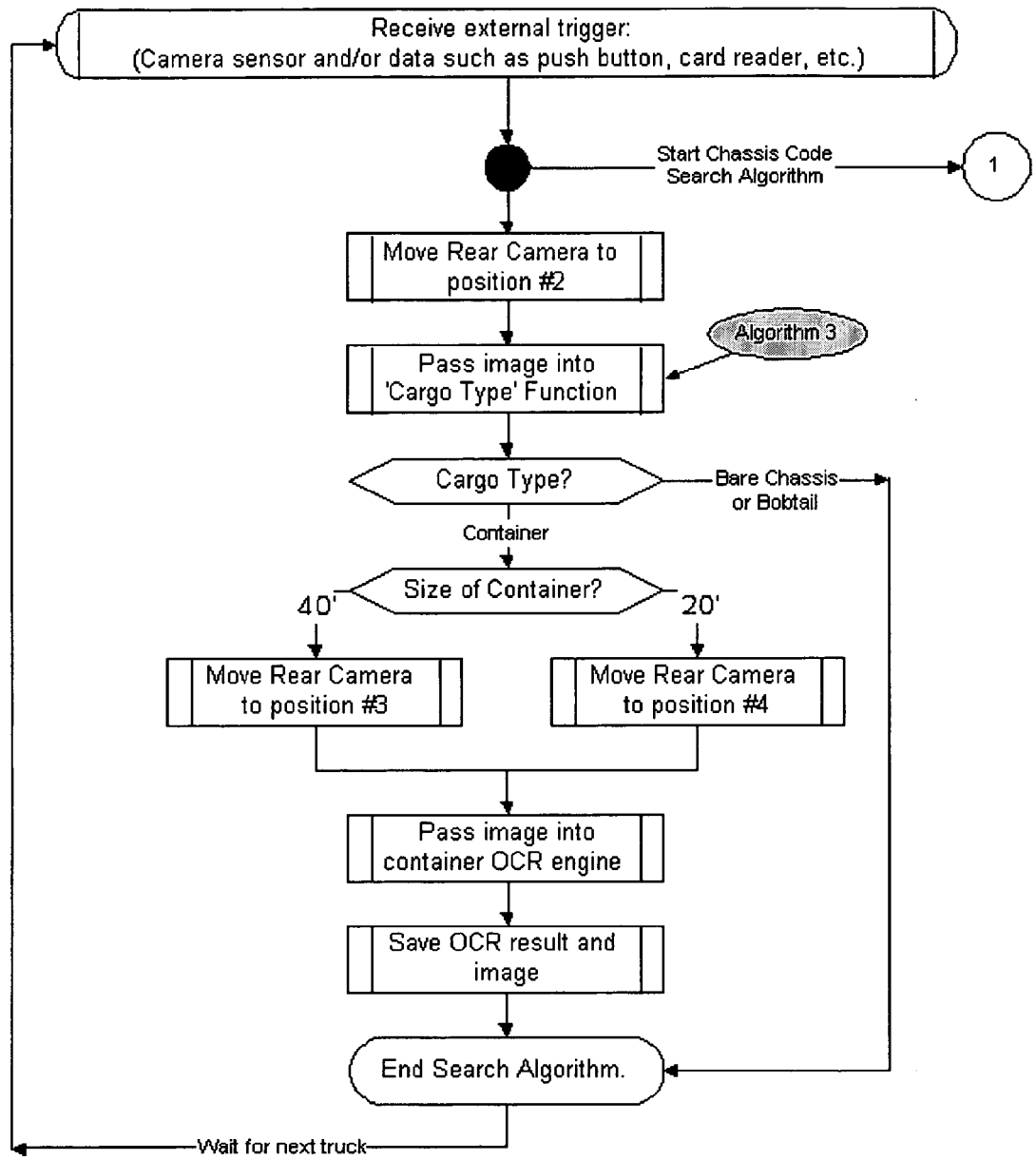

Chassis Code Search Algorithm

Algorithm 1: Motion Detection #1

Algorithm 3: Cargo Type Determination

Algorithm 5: Side Camera Relocation

METHOD AND APPARATUS FOR CONTROLLING CAMERAS AND PERFORMING OPTICAL CHARACTER RECOGNITION OF CONTAINER CODE AND CHASSIS CODE

BACKGROUND OF THE INVENTION—FIELD OF INVENTION

This invention relates to the field of transportation, and in particular, to a system for optical character recognition (OCR) of transportation container codes and truck chassis codes within an intermodal terminal, truck depot, warehouse, factory, or any other facility that processes containers or chassis into and out of the facility.

BACKGROUND—DISCUSSION OF PRIOR ART

In a typical container terminal or similar container processing facility's gate area, without any form of OCR, a truck enters the facility through a security gate and then stops within one of the gate area's gate lanes. The truck may be pulling a chassis, and the chassis may be carrying a container. For the purposes of this description, it is assumed that the truck is entering the gate with both a chassis and a container, however, it should be noted that a truck may enter or exit the terminal with a chassis and container, with chassis only, or 'bobtail' (with neither chassis nor container). While in the gate lane, the truck driver will exchange information with a remote clerk via an industrial kiosk, and then receive instructions on where to proceed within the terminal. In order to process the driver, the clerk will control a rear camera and a side camera to locate and view the container code and chassis code respectively. The container and chassis codes are then used by the terminal operating system (TOS) to provide directions to the driver. A typical container terminal has many gate lanes. A similar gate area and process is used when the truck exits the facility.

Referring to FIGS. 1A and 1B, in a typical container terminal performing OCR, a truck passes through a security area 100 and then a portal 102. Multiple fixed-mount cameras are located around the portal, to ensure that the sides, top, and rear of the container and chassis can be viewed. Each camera is connected to a Personal Computer (PC) or server, which processes the images from the camera. As the truck proceeds through the portal, images from each camera are processed, and container and chassis OCR results are archived. The portal 102 is separate from the terminal's gate area video system, which includes rear camera 108 and side camera 110.

In addition, as the truck proceeds through the portal, the truck's identification number (ID) and/or a truck driver's ID is typically read, associated with the corresponding container and chassis OCR results, and archived for matching purposes. Typical truck ID mechanisms are a License Plate or a Radio Frequency Identification (RFID) number if the truck is equipped with an RFID tag. Typical truck driver ID mechanisms are a driver's license, a facility issued RFID card, or a biometric, such as the driver's fingerprint. The truck driver ID devices are typically located on a separate security gate, kiosk, or pedestal in the security area 100.

After proceeding through the portal 102, the truck proceeds to a gate lane as shown in FIG. 1B, where it is processed by the remote clerk, as described in the non-OCR scenario above. In addition, the truck or driver ID is read and matched to the ID previously stored in the database. The ID is then used to retrieve the associated container and chassis codes archived by the portal. The OCR results for the container code, chassis code, and truck ID (if applicable) are then typically verified by the clerks, using the gate area's video system. In addition, the clerks use the video system to process the exceptions when the portal system does not return any results. The verified container and chassis codes are then used by the terminal operating system (TOS) to provide directions to the driver.

The portal system has the following disadvantages:
a) Cost: Every portal is, in itself, very expensive. The portal consists of a steel structure, expensive fixed-mount digital cameras, lighting systems, a truck or driver ID system, a traffic control system, such as traffic lights or automatic gate-arms, and several processing servers. In addition, every portal requires additional infrastructure, such as a control room for the servers, electrical power to the portal, and data conduit to the portal. The costs for trenching, conduit, back-filling, and pulling cable will often exceed the cost of the portal itself. Finally, every portal carries additional maintenance costs, over and above the maintenance of other site equipment. Typically, these systems involve the maintenance of proprietary, complex systems, requiring special training and the inventory of uncommon or critical spare parts.
b) Reliability: Typically, one portal will be set up to process trucks for up to 8 kiosks within the gate area. If the portal is not functioning, then the entire group of kiosks cannot be utilized. Thus, the use of portals exposes the facility to significant down-time, if the portal stops functioning.
c) Accuracy: Since a portal relies upon the matching ID to determine the container and chassis code when the truck is at a gate area, the total OCR accuracy is a function of the OCR accuracy multiplied by the accuracy of the ID reader at the portal multiplied by the accuracy of the ID reader at the gate area. A failure of any one of these systems will cause the numbers provided to the remote clerks to be inaccurate.

SUMMARY

The following are some of the objects and advantages of the invention:
a) Perform container and chassis OCR using the terminal's gate area video system, and therefore at a reduced cost, since it does not require additional site infrastructure, such as a portal structure, cameras, lighting, control equipment, electrical power, trenching, conduit, cabling, etc.
b) Perform container and chassis OCR without introducing additional maintenance costs to a site that already has a gate area with a video system.
c) Increase system reliability through redundancy of gate lane equipment. For example, if a single camera is not functioning within a specific gate lane, then only that gate lane is shut down, whereas with the portal system, the entire group of pedestals would not be functioning. Therefore, for the risk of shutting down the entire facility is significantly less than with the portal system.
d) Perform container and chassis OCR directly on the equipment within the gate lane, and without relying on matching. Therefore, the accuracy of truck or truck driver ID reading does not affect the accuracy of container and chassis OCR.

e) Optionally, sense when a truck is present within a specific gate lane.
f) Determine the type of equipment associated with the truck in the gate lane, without the need for matching:
   i) Bob-tail: a tractor-trailer truck, without a container or chassis;
   ii) Bare chassis: a tractor-trailer truck pulling only a chassis; or
   iii) Container: a tractor-trailer pulling a chassis and a container.
g) Automatically aim the gate lane's video camera to read the container and chassis code, so that the clerk does not need to manually aim the camera in order to verify the data:
   i) Aim the rear camera to view the container's number, located on the upper right hand corner of the container door
   ii) Aim the side camera to view the chassis code, located on the chassis beam Further objects and advantages of this invention will become apparent from a consideration of the drawings and ensuring description.

The invention solves at least all the problems discussed above regarding the prior art.

The invention is a system and method for controlling common closed circuit television (CCTV) cameras to locate container code and chassis code images, and resolving the images into container code and chassis code text using optical character recognition (OCR), which can be archived for use by the terminal operating system (TOS). The TOS contains a database of information related to container codes and chassis codes.

The apparatus of the invention includes common CCTV cameras, cabling, and a personal computer (PC) or server. The CCTV cameras have the capability of saving and returning to specific pan, tilt, and zoom locations. These and any other variables affecting camera view are referred to as a camera viewing position. Changing more than one variable affecting the camera viewing position is referred to as 'aiming' the camera; where one variable is changed, the term for that variable is used (for example, panning). Saved camera viewing positions are referred to as preset positions. The PC or server has installed one or more image frame grabber cards and one or more outputs, with the capability of outputting the appropriate communication protocol for the specific model of CCTV camera used.

DRAWINGS—FIGURES

FIGS. 3A to 3C show the basic camera locations and directional movements performed by the invention while a truck is within the gate lane.

FIGS. 5A to 5C are flow charts describing the search algorithms used by the invention to locate the container and chassis codes.

DRAWINGS—LIST OF REFERENCE NUMERALS

100 Security area
102 Portal
104 Gate Lane
106 Industrial Kiosk
108 Rear Camera
110 Side Camera
112 Top Front Container Code
114 Top Rear Container Code
116 Back Rear Container Code
118 Chassis Code
120 Interface Server
122 Lane Server
124 Video Cable
126 Camera Control Cable
128 External Video System
132 LAN (network) Connection
134 Video Frame Grabber Card
136 Multi-port Serial Card
T Truck
C Container
Ch Chassis

DETAILED DESCRIPTION

Process Description

Figure 1A:
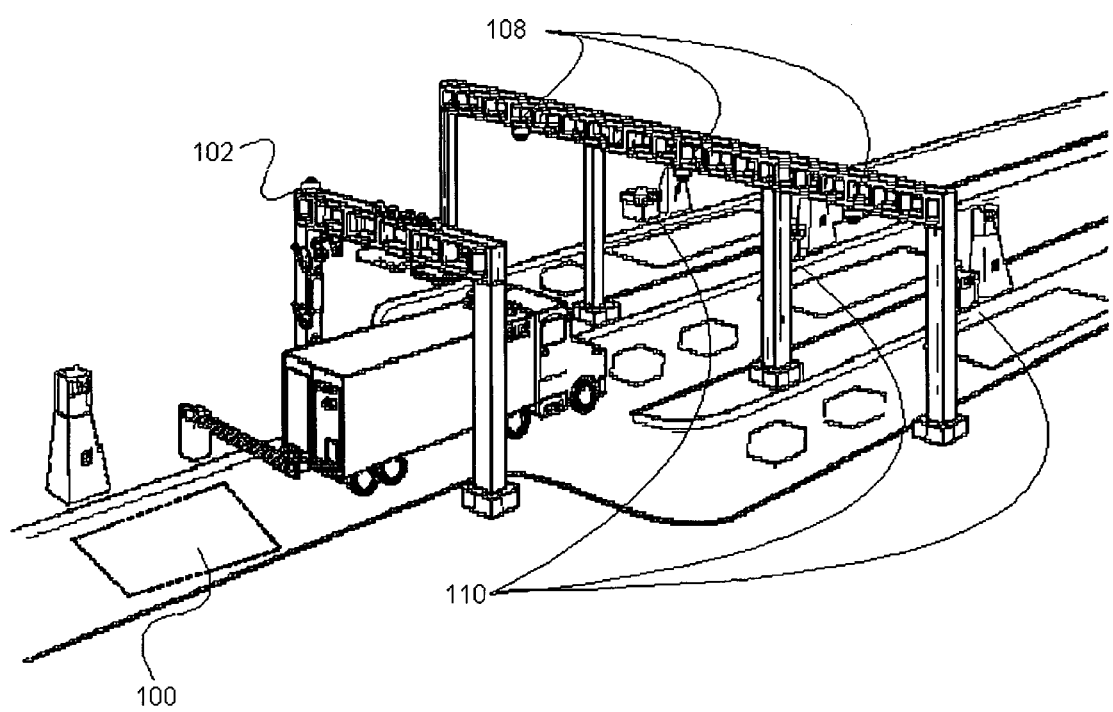
FIGS. 1A to 1B show a typical prior art terminal or container processing facility's gate area utilizing portal-based OCR.
Figure 1B:
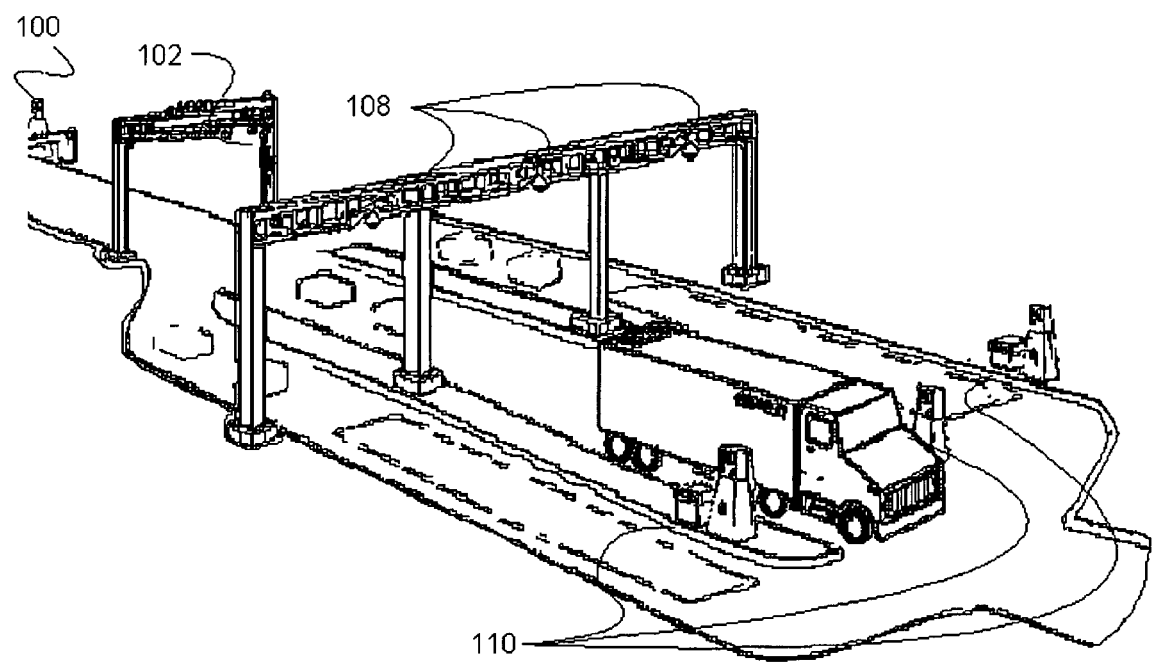
Figure 2:
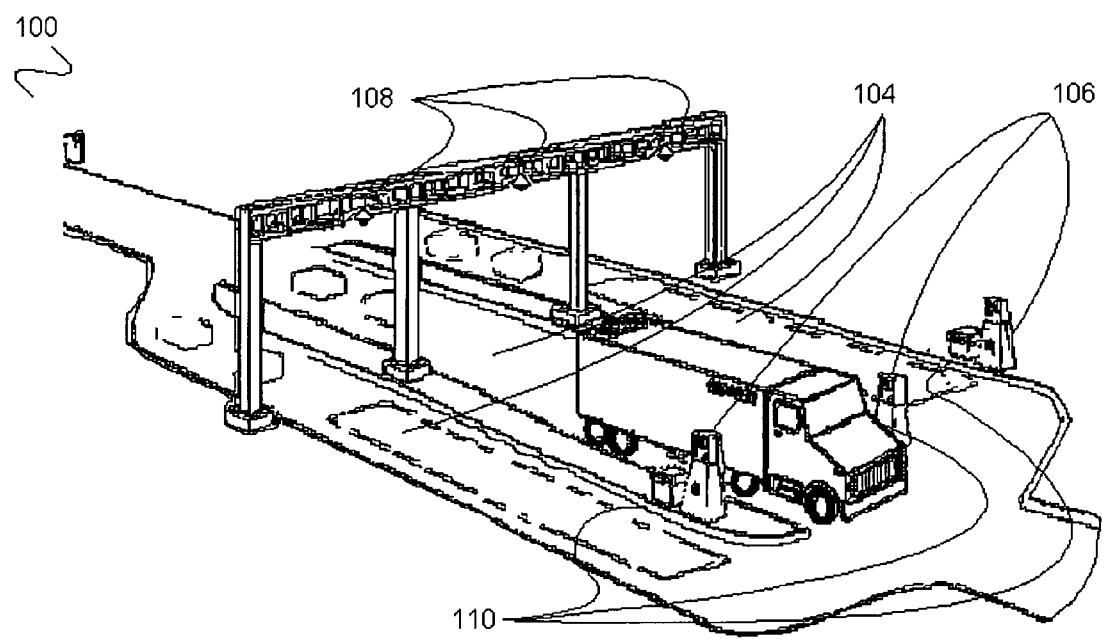
FIG. 2 shows a terminal or container processing facility's gate area according to an embodiment of the invention.

A typical embodiment of a container terminal's gate area, without portal OCR, is shown in FIG. 2. This invention was developed to control the same rear cameras 108 and the side cameras 110 used by the remote clerks for the purpose of locating the container code and chassis code, and pass the respective images into a container OCR engine and a chassis OCR engine.

In the configuration shown in FIG. 2, the truck driver driving a truck T having a container C on a chassis Ch enters the facility through a security area 100 and then stops within one of the gate area's gate lanes 104. In overview, as the truck T enters the gate lane 104, the invention begins to process the container code. When the truck comes to a stop, the rear camera 108 is automatically aimed for the clerk to view the container code. At the same time, once the truck is stopped, the side camera 110 is used to scan the side of the chassis to determine the chassis code. Similar to the non-OCR process, while in the gate lane, the truck driver will exchange information with a remote clerk via an industrial kiosk 106, and then receive instructions on where to proceed within the terminal. The container and chassis codes are first verified by the clerk using the rear and side cameras respectively, and then used by the terminal operating system (TOS) to provide directions to the driver. Although this diagram shows only three gate lanes, a typical container terminal has many more gate lanes. A similar gate area and process is used when the truck driver exits the facility.

Figure 3A:
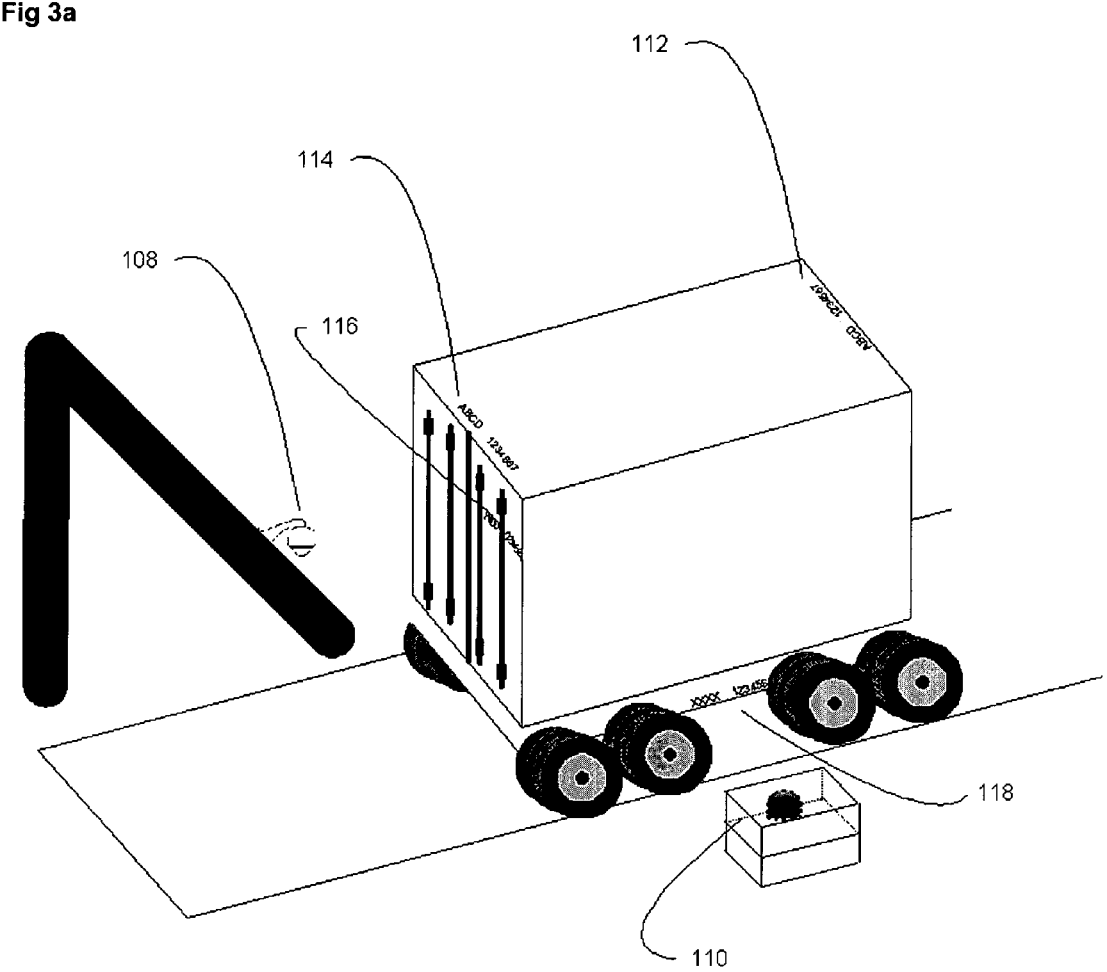

A single gate lane with only a rear camera 108 and side camera 110 is shown in FIG. 3a. The container's coding conforms to the ISO 6343 standard. There is no similar standard governing the location of the chassis coding. FIG. 3a also shows the container codes and chassis codes that the invention (in one embodiment) reads. The top front container code 112 and the top rear container code 114 are processed by the invention using the rear camera 108 as the container C passes underneath the camera 108. The back rear container code 116 and the side chassis code 118 are processed by the invention using the rear and side cameras 108, 110 respectively, after the container has completely stopped.

Figure 3B:
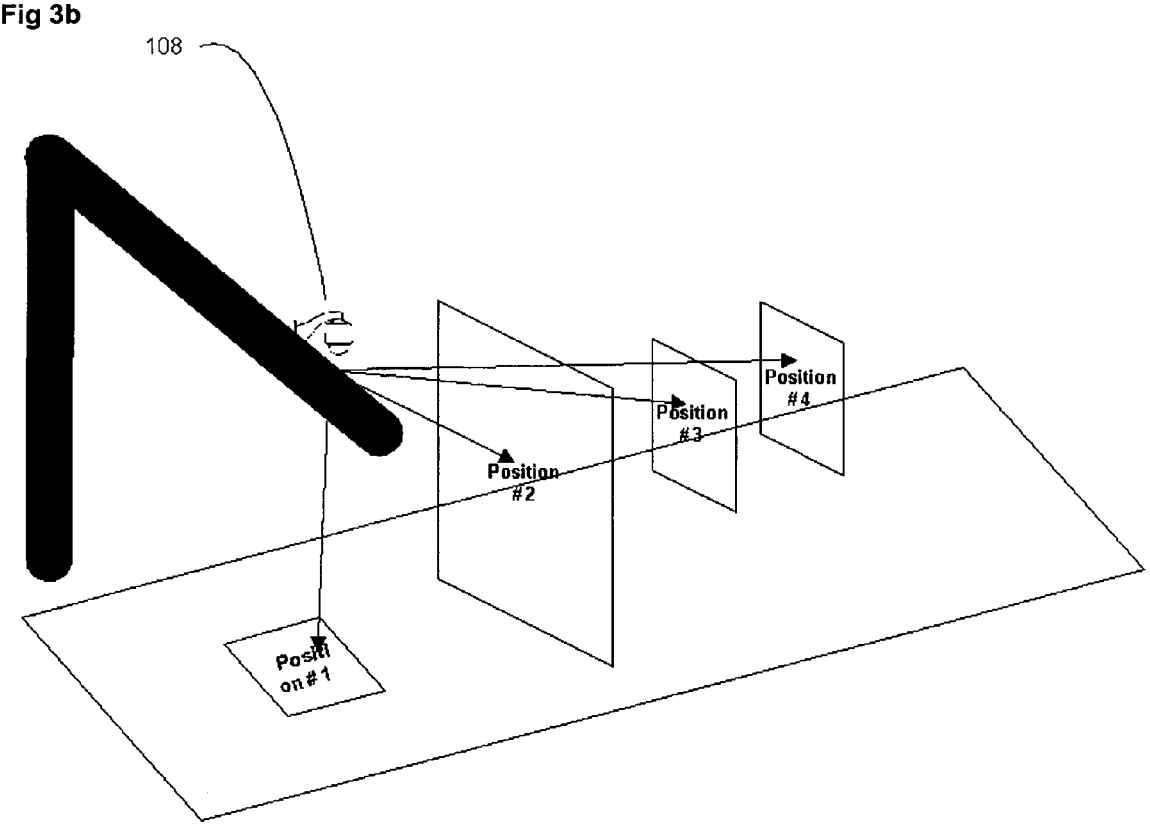

FIG. 3*b* shows the rear camera's 108 four (in a preferred embodiment) different preset positions that may be recalled during the container code search process. FIG. 3*c* shows the side camera's 110 position #1, a preset position that will be recalled during the chassis code search process. Implementation of the invention requires each preset position for both cameras in each gate lane to be accurately and independently set up.

System Apparatus

Figure 4A:
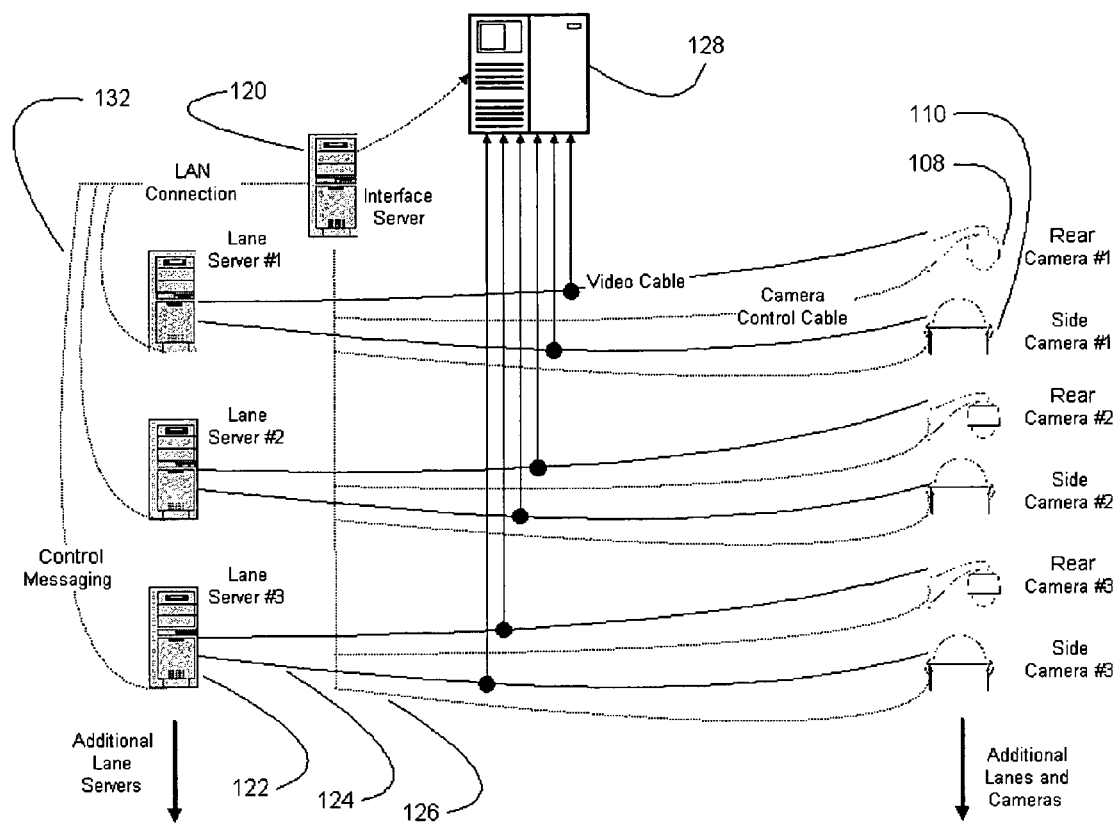
FIGS. 4A to 4F show a typical embodiment of the invention's system apparatus.

FIGS. 4*a* through 4*f* show a typical embodiment of the system apparatus. The system, as shown in FIG. 4*a*, consists of one Interface Server 120, one or more Lane Servers 122, video cabling 124, camera control cabling 126, rear cameras 108, and side cameras 110. The Interface Server controls all of the cameras, and receives messaging from each Lane Server. The Lane Servers control the cameras by transmitting messages to the Interface server over the Local Area Network (LAN) 132, processes video images through direct connections to one or two sets of rear and side cameras, and transmit the OCR results to the Interface Server, for local storage or distribution to the Terminal's Operating System (TOS).

Figure 4B:
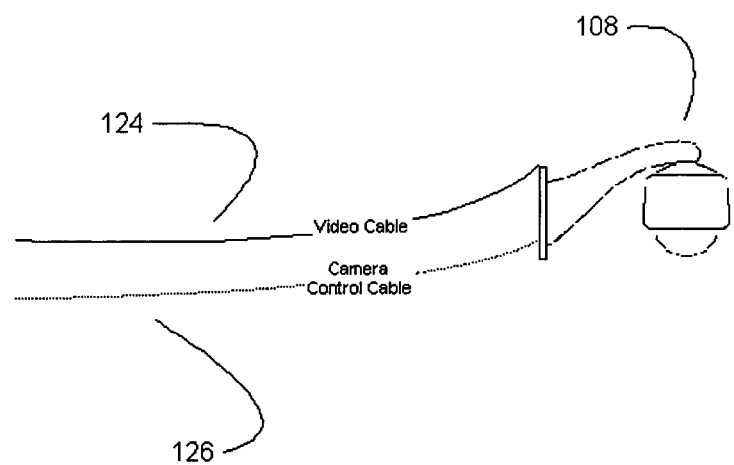

As shown in FIG. 4*b*, the rear camera 108 is a common CCTV camera, which in an embodiment transmits an NTSC, rs170 video signal over the video cable 124. The video cable is connected to a Lane Server. The rear camera is controlled by serial data messages (or other protocol), which are transmitted from the Interface server to the camera over the camera control cable 126. It should be understood that generally controlling CCTV cameras is conventional and other methods, such as wireless, may be used. Each rear camera has the ability to pan, tilt, and zoom. In addition, each rear camera is capable of storing and recalling preset positions.

Figure 4C:
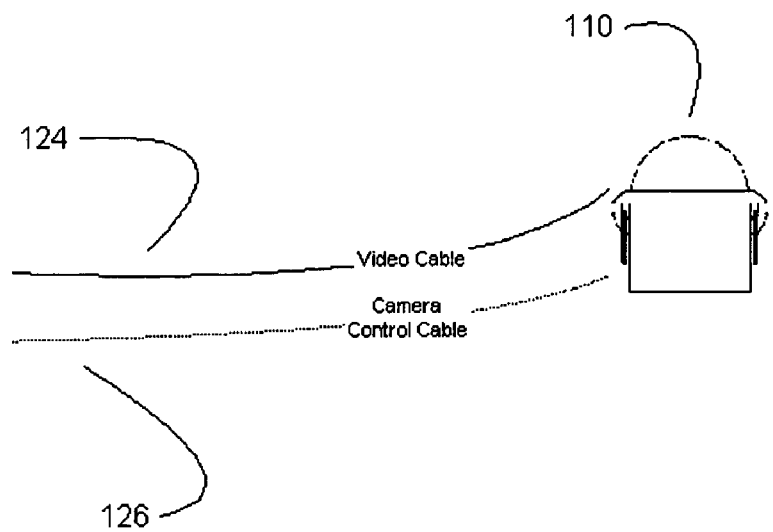

The side camera, as shown in FIG. 4*c*, is connected in a similar manner to the rear camera. In addition, the side camera is capable of storing and recalling preset positions.

Each Lane Server is connected to one rear camera and one side camera (FIG. 4*d*) or optionally to two rear cameras and two side cameras in the two-lane configuration (FIG. 4*e*), via the video cable. Each Lane Server requires one or more video frame grabber cards 134 to digitize the video images received. The purpose of each Lane Server is to process the received video images and to transmit the OCR results to the Interface Server. The Lane Server also controls each camera, via messaging over the LAN connection 132 to the Interface Server.

The Interface Server is connected to all rear and side cameras via the camera control cable. The purpose of the Interface Server is to receive OCR results from each Lane Server and output the data to the TOS. In addition, the Interface Server directly controls each camera, moving it to the appropriate location, based upon messaging from the Lane Servers. It should be appreciated that the functions of the Interface Server and Lane Server could be performed by a single computing unit or combined in any other manner, and the allocation of computing functions is not critical. In an embodiment, all algorithms run on the Lane Server. The Lane Server sends camera positioning instructions to the Interface Server, which then executes said instructions to aim the camera using the appropriate preset position.

Optionally, the video signal can be spliced from an external video system 128, which is used to control cameras and view the resulting video images. In this situation, each CCTV camera is already connected to a video matrix switcher, which is then routed on to each user's CCTV monitors. The connection between the CCTV camera and the matrix switcher can be spliced so that each camera is also connected to a Lane Server.

Similarly, each camera's control cable can be connected through the Interface Server to the external video system 128. The software on the Lane Server then transmits all received data on a separate communication port, and parses the camera protocol and insert useful camera commands, such as go to preset #1, etc. For example, the control cable coming from the existing system to Camera #1 can be cut, and the cable from the system routed into communication port #1 on the Interface Server. Next, the cable to the camera can be connected to communication port #2 on the Interface Server. The Interface Server's software transmits any data received on Port #1 to Port #2, and vice-versa. In addition, the Interface Server can control camera #1 by sending the appropriate data on Port #2.

In an alternative embodiment, the apparatus could be configured with Internet Protocol (IP) cameras, which both output video and receive camera control messages using IP. With this configuration, no separate physical connection is required for camera control messages, and it is possible for the Interface Server and Lane Server functions to reside and operate at a great distance from the cameras.

Camera Search Algorithms

Figure 5B:
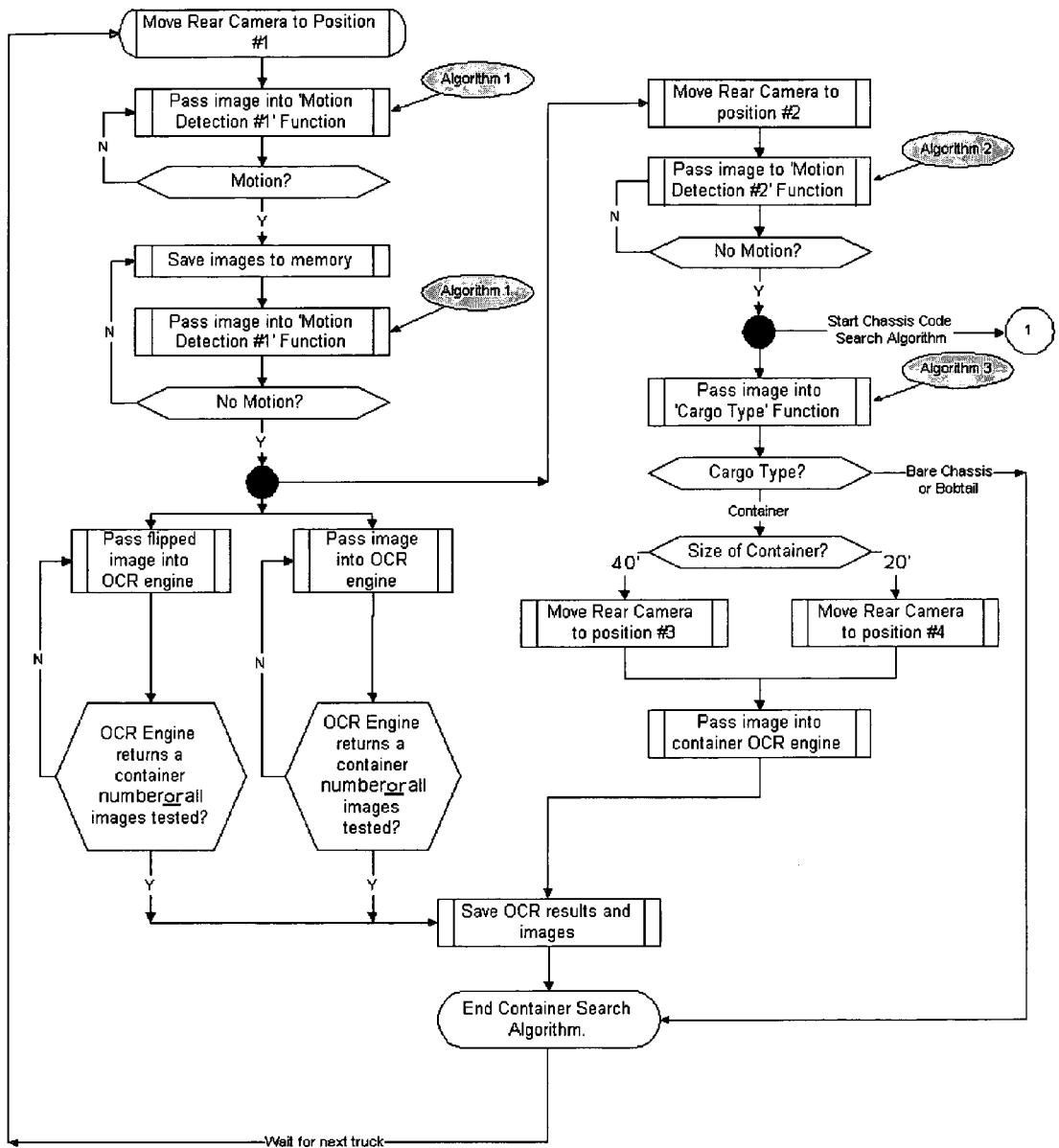
Figure 5C:
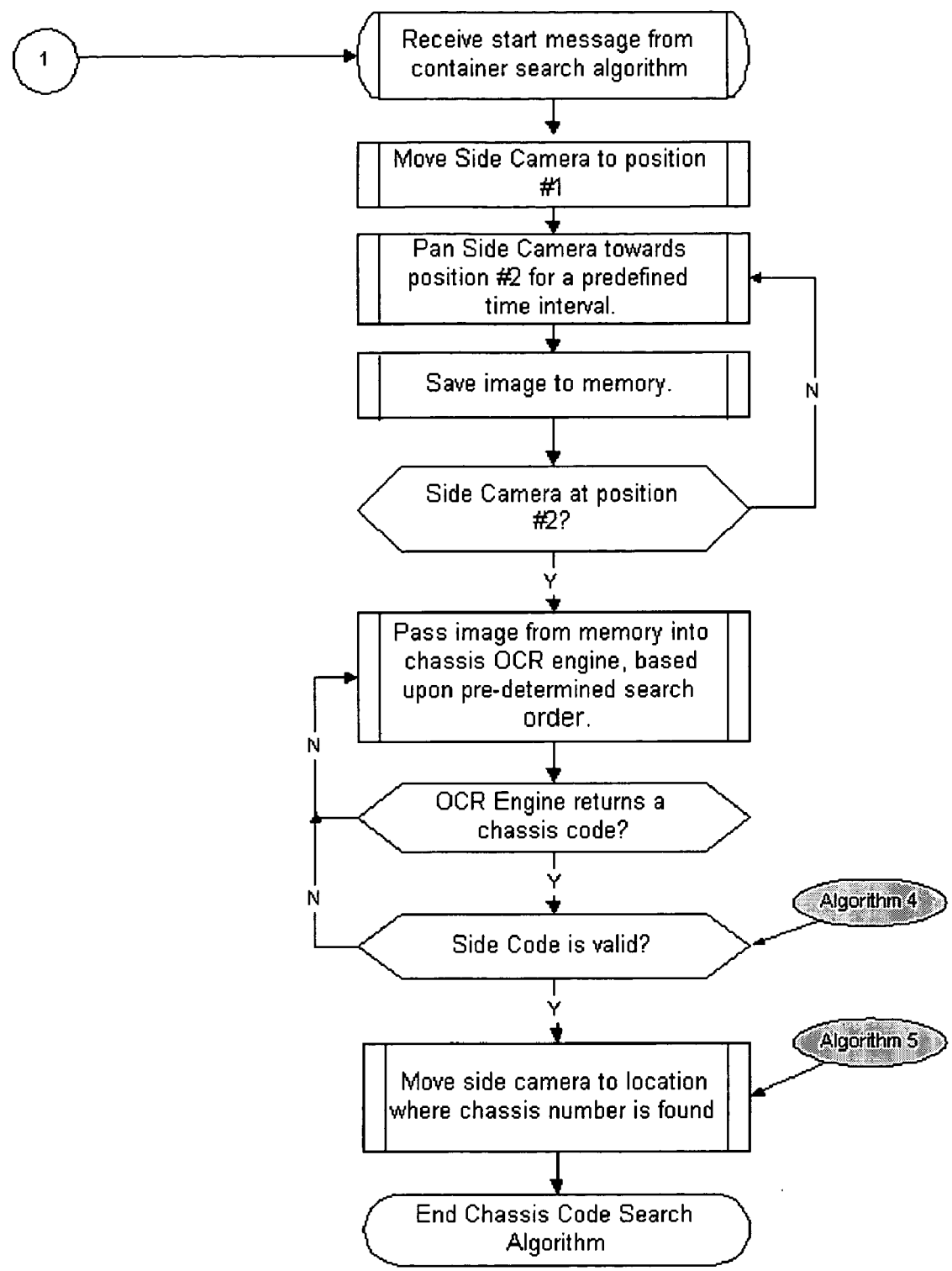

The invention utilizes three main search algorithms, each of which is executed on the Lane Server:

i) Container Code Search Algorithm with External Trigger (FIG. 5*a*)
ii) Container Code Search Algorithm with Camera Sensor (FIG. 5*b*)
iii) Chassis Code Search Algorithm (FIG. 5*c*)

Each of these algorithms is described in detail below. In every description below, when the function 'aims' a camera, the mechanism is actually that the Lane Server sends a message to the Interface Server to recall a specific preset position on the camera. The Interface Server, which is connected to the camera via control cable 126 (FIG. 4*a*), then sends a signal to aim the camera to a specific preset position. In addition, in each case the OCR results are saved locally on the Lane Server, and then passed on to the Interface Server for further processing. The following algorithms are physically present on the Lane Server only.

The container code search algorithm to be used for an implementation of the invention (either i, with external trigger, or ii, with camera sensor) is determined by a configuration file setting. If the Camera Sensor is used, each gate lane requires a dedicated Lane Server. If an External Trigger is used, the requirement for video processing is reduced, and therefore a single Lane Server can be configured to handle multiple gate lanes.

Figure 6A:
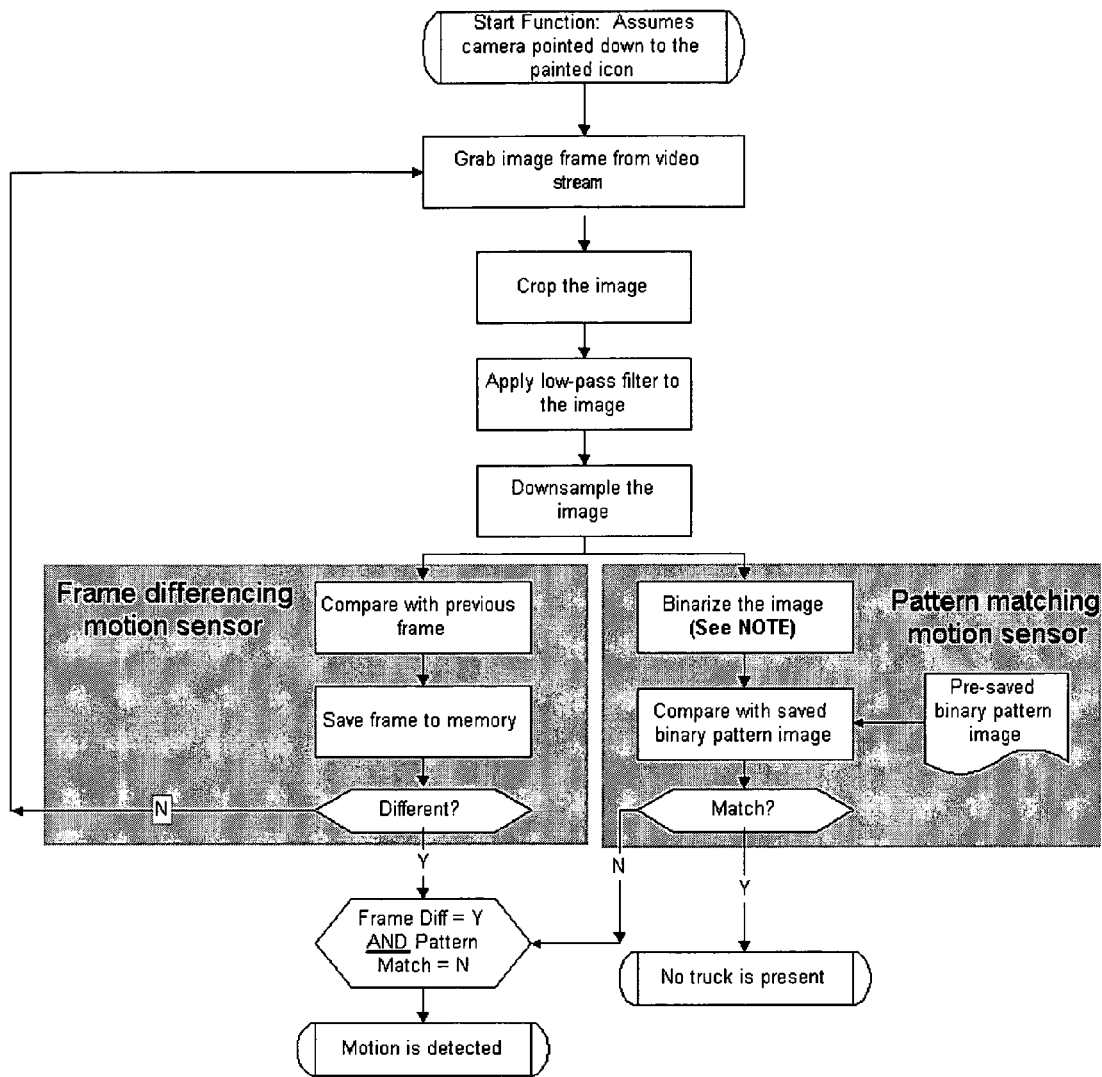
FIGS. 6A to 6E show the detailed flow chart for each of the algorithms referenced in FIGS. 4A to 4C.
Figure 6B:
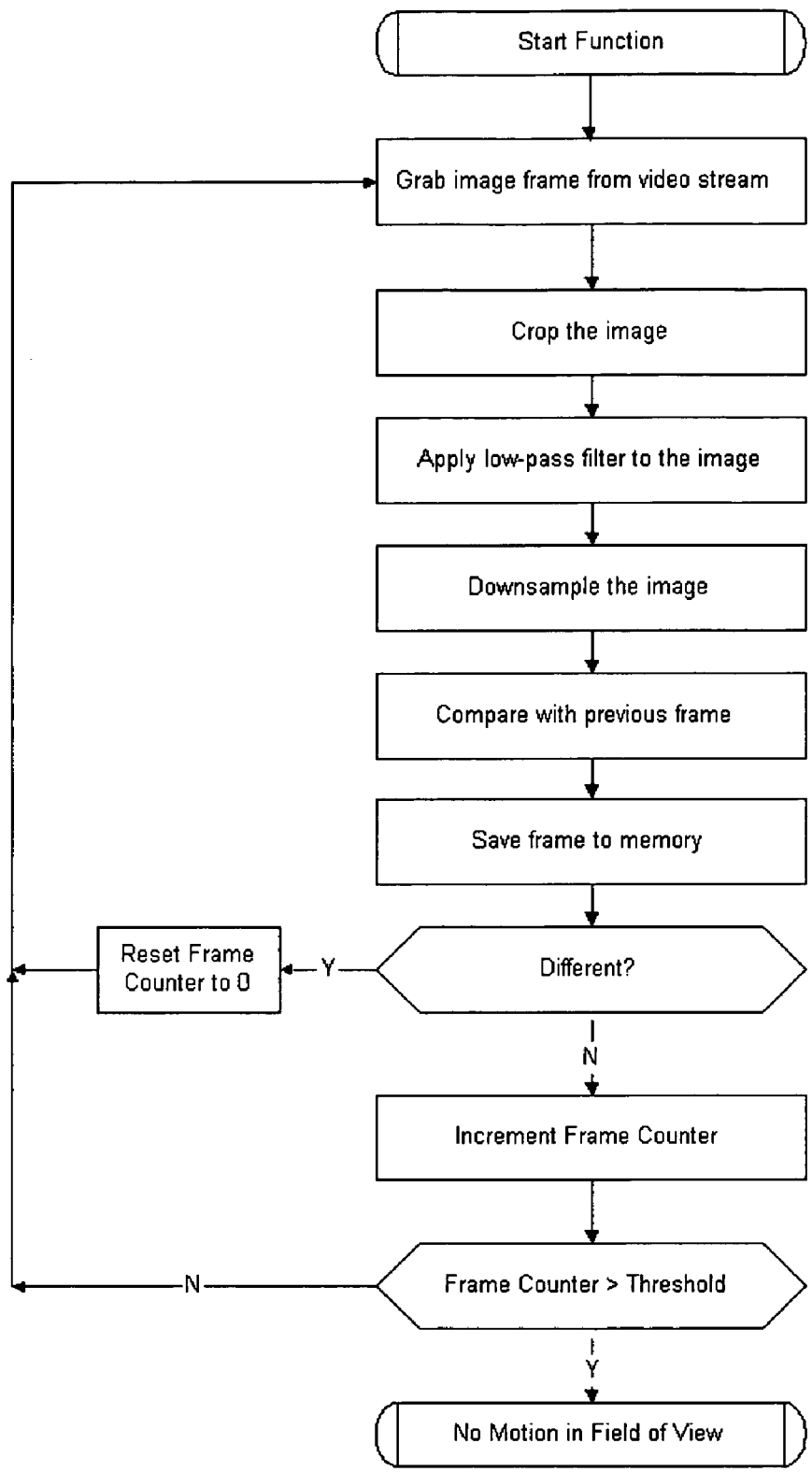
Figure 6C:
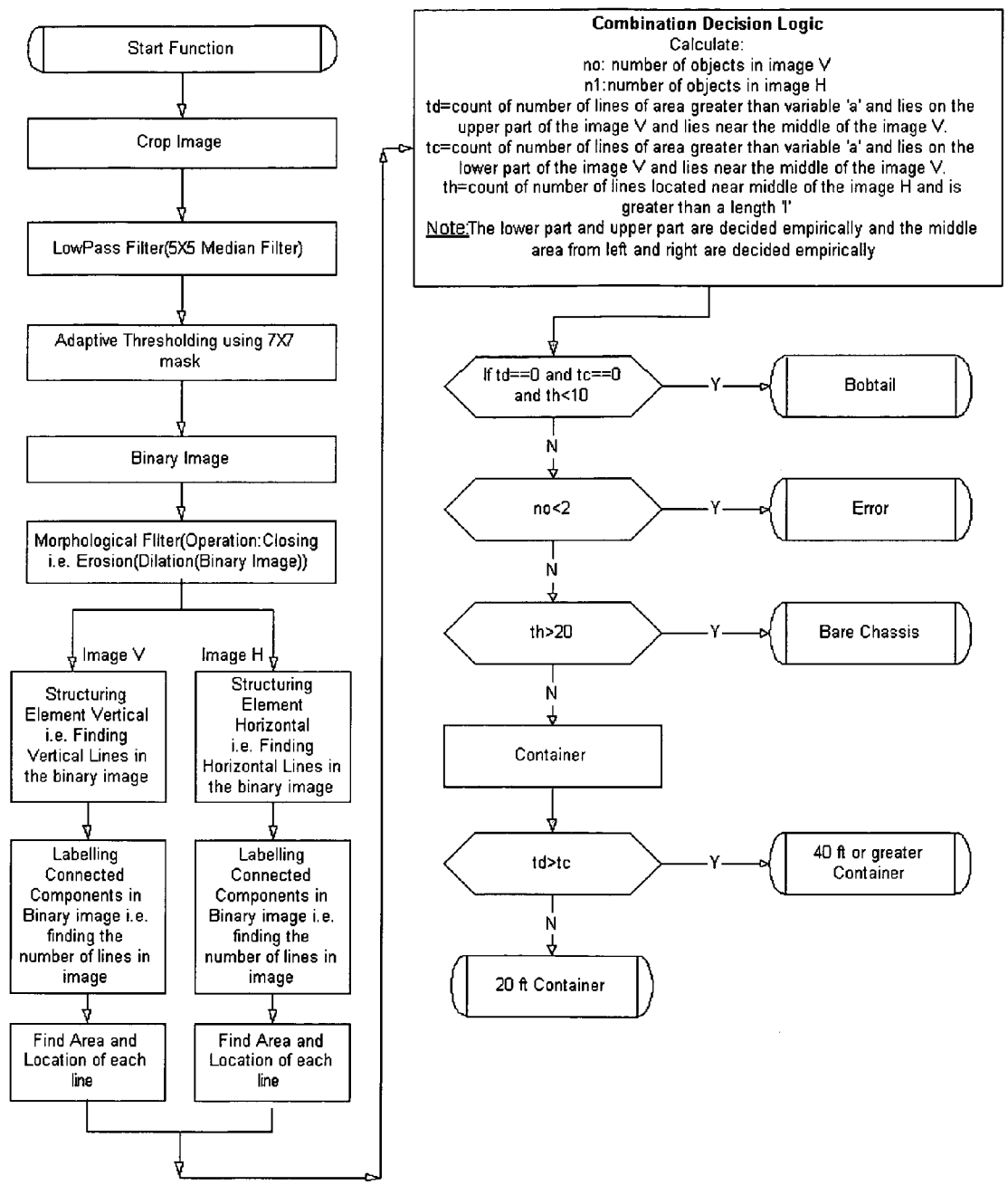
Figure 6D:
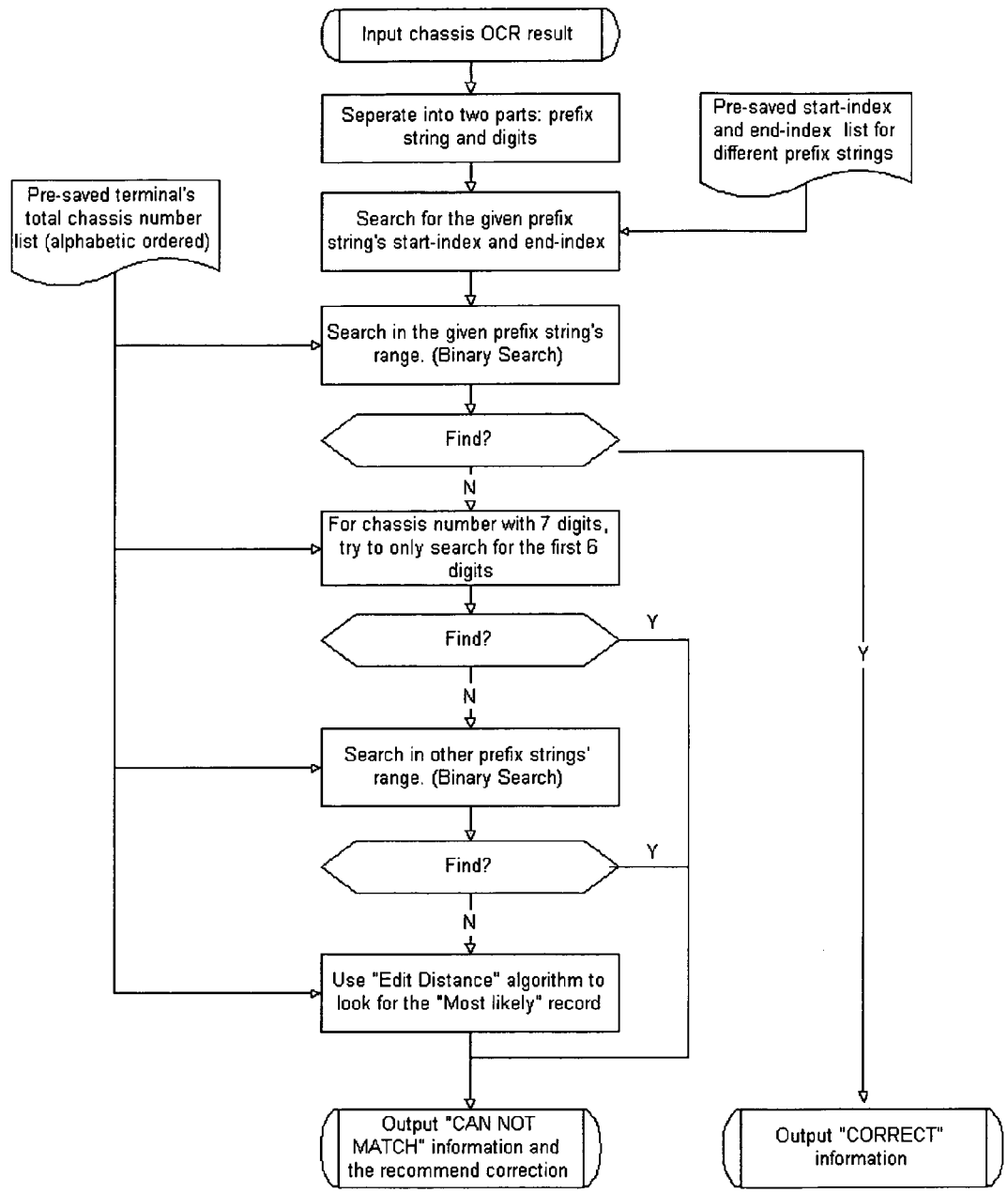
Figure 6E:
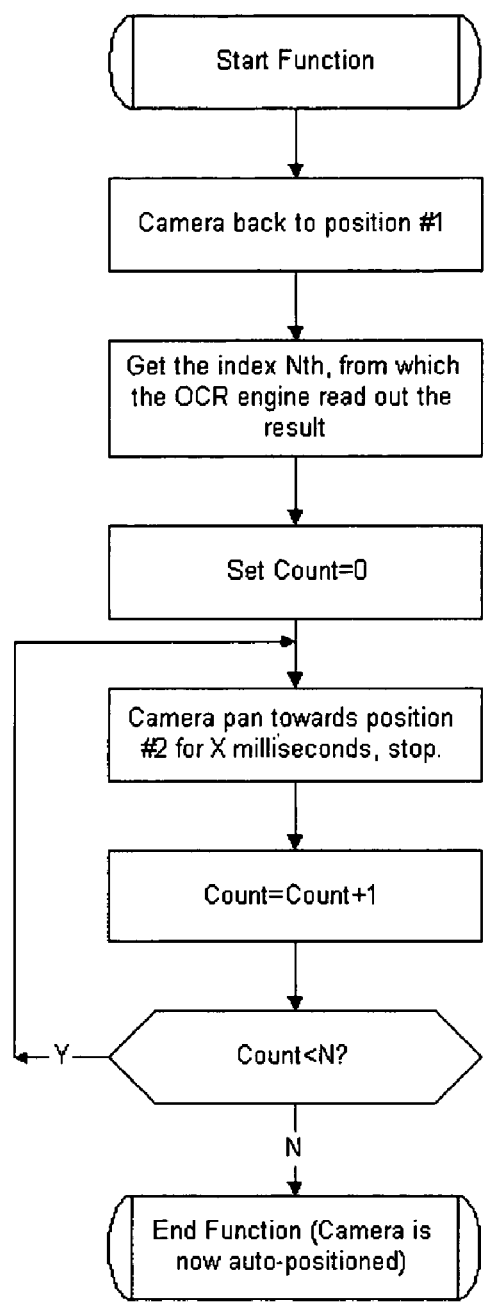

In addition, the following processing algorithms are utilized by the search algorithms, and are described separately below.

iv) Motion Detection #1 Algorithm (FIG. 6*a*)
v) Motion Detection #2 Algorithm (FIG. 6*b*)
vi) Cargo Type Determination Algorithm (FIG. 6*c*)
vii) Chassis Code Validation Algorithm (FIG. 6*d*)
viii) Side Camera Relocation Algorithm (FIG. 6*e*)

i) Container Code Search Algorithm with External Trigger

Figure 4D:
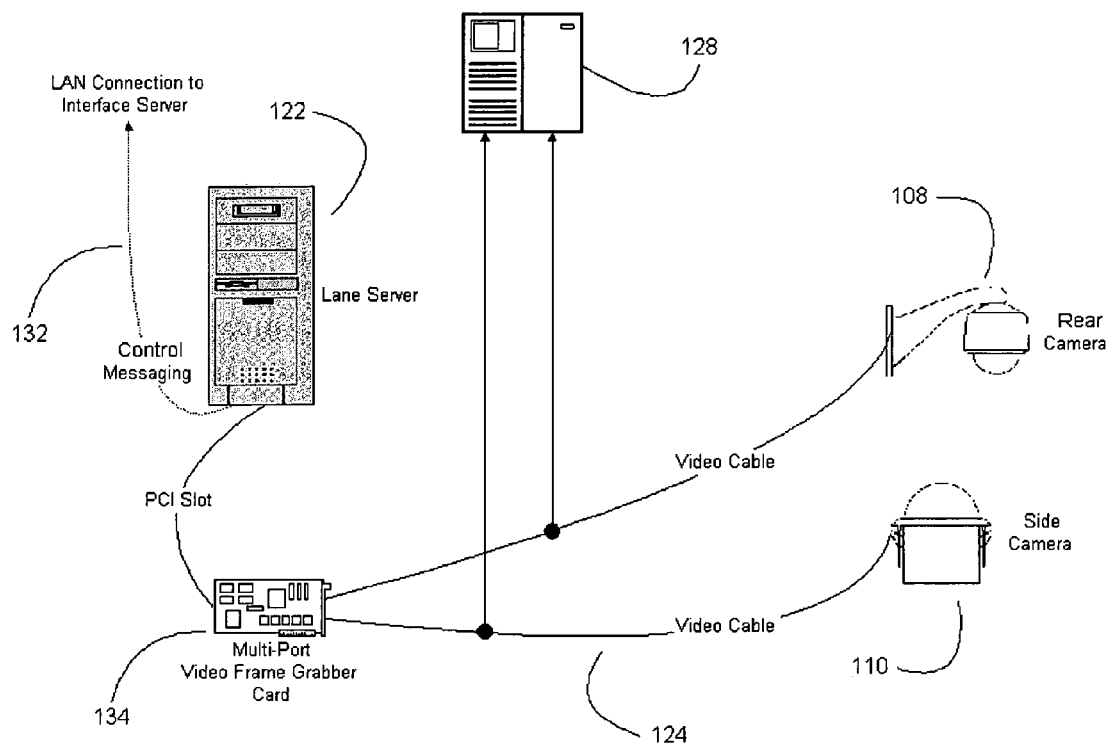
Figure 4E:
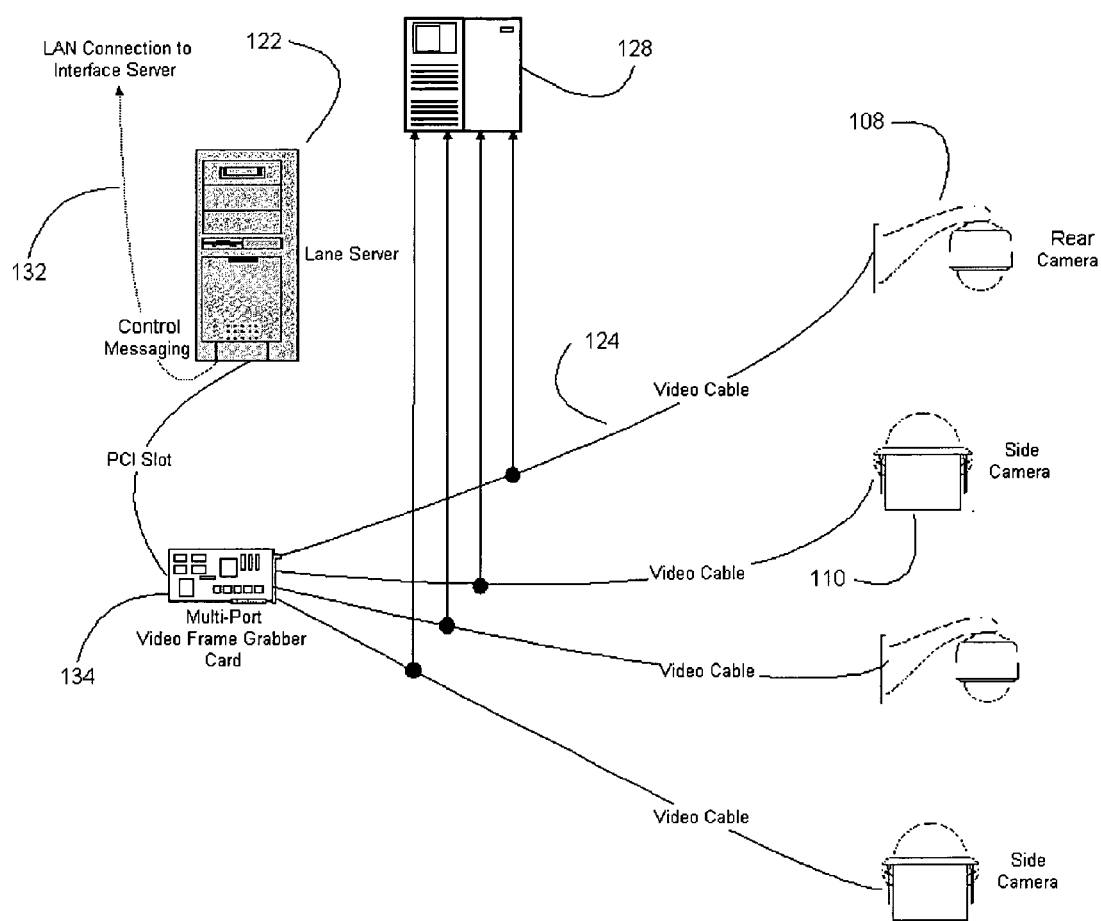
Figure 4F:
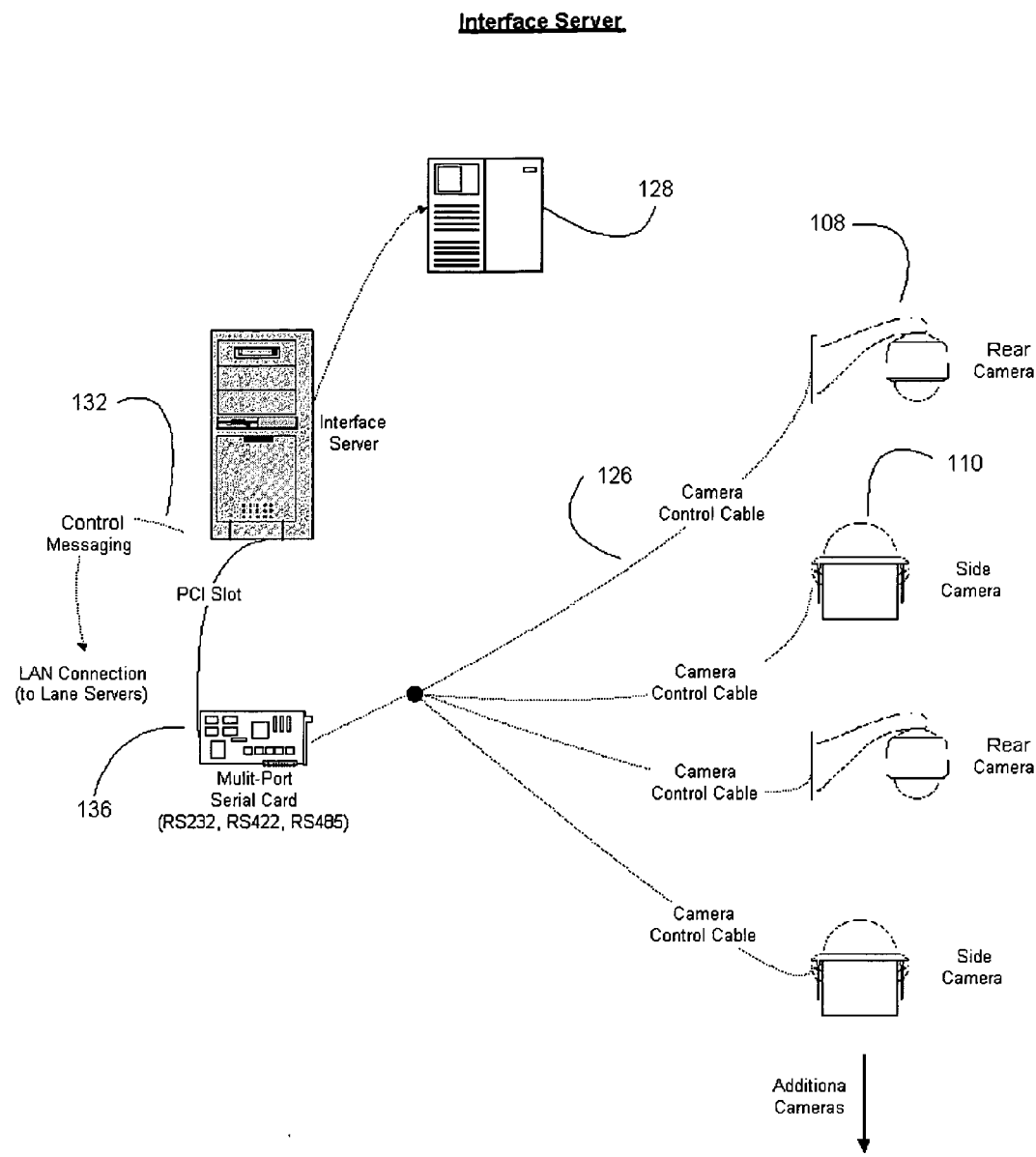

In this mode, one Lane Server can process one gate lane (one rear and one side camera) or more gate lanes simultaneously, as shown in the apparatus setup in FIG. 4e. Also, in this mode, only the container code on the back rear of the truck 116 (FIG. 3a) is processed. The Container Code Search Algorithm with External Trigger is presented in flow chart format in FIG. 5a.

The Lane Server application waits until it receives an external trigger (such as camera sensor, push button, or card reader) indicating that a truck has stopped within the gate lane 104 (FIG. 5a, see also FIG. 2). After receiving the trigger, the Lane Server instructs the Interface Server to aim the rear camera at position #2 (FIG. 3b), which presents a wide view of the rear of the truck. At the same time, the chassis code search algorithm (FIG. 5c) is started, on a separate thread, which is described below.

While the rear camera is at position #2, the 'Cargo Type Determination' function (FIG. 6c) is utilized to determine the type of cargo present within the gate lane. If the cargo is determined to be a bare chassis or a bobtail, then the search algorithm ends, because no container is present. If a 40 foot or greater container is found, then the rear camera is aimed at position #3 (FIG. 3a). If a 20 foot container is found, then the rear camera is aimed at position #4 (FIG. 3a). The new image from the rear camera is then digitized and passed into the OCR engine. The results and the image are then saved locally on the Lane Server.

Prior to the utilization of this function, the preset positions as shown in FIG. 3b are established using configuration software.

ii) Container Code Search Algorithm with Camera Sensor

In this mode, the Lane Server can only process one gate lane (one rear camera and one side camera), as shown in the apparatus setup in FIG. 4d. Also, in this mode, up to three container codes are processed: The top front container code 112, the top rear container code 114, and the back rear container code 116 (FIG. 3a). The Container Code Search Algorithm with Camera Sensor is presented in flow chart format in FIG. 5b.

The Lane Server first instructs the Interface Server to aim the Rear Camera at Position #1 (FIG. 3b), which views the top of the truck. The Lane Server then continually passes the digitized image into the 'Motion Detection #1' function (FIG. 6a), until motion is detected. Motion indicates that a truck is starting to pass underneath the camera. Next images are continuously saved into memory and passed into the 'Motion Detection #1' function (FIG. 6a), until no motion is detected. When no motion is detected, the truck is assumed to have finished passing underneath the cameras. The saved images are processed in the next steps of the function, so they must be written into unused memory space and do not overwrite each other.

Two more threads are now started. These threads process the images of the top of the container, which were previously saved into memory. The first new thread starts with the first image saved, and passes 'flipped' images into the OCR engine. These images need to be 'flipped' because the top front container code will only appear normal when viewed from the front of the truck. The second new thread starts with the last image saved and passes images (not flipped) into the OCR engine. Each thread ends when either the OCR engine returns a container code or all images have been tested. OCR results and the associated image are saved locally on the Lane Server.

The original thread aims the rear camera at position #2 (FIG. 3b), which presents a wide view of the rear of the truck. At this time, we know that the truck T has passed beyond position #1 (FIG. 3b) because Algorithm #1 continues until the pattern matching shows that the rear camera sees the painted icon (or equivalent), as explained below. This image is then passed into 'Motion Detection #2' function (FIG. 6b), until no motion is detected, which indicates the truck has come to a complete stop. This function now performs identically to the Container Code Search Algorithm with External Trigger, except that no external trigger is required.

The four pan, tilt, and zoom preset positions as shown in FIG. 3b are pre-established and calibrated using configuration software prior to the start-up of this algorithm.

iii) Chassis Code Search Algorithm

The Chassis Code Search Algorithm is presented in flow chart format in FIG. 5c. This search algorithm is initiated when it receives a message from either of the container code search algorithms, listed above, indicating that a truck is in the gate lane and is completely stopped. This algorithm is preferably run on a separate thread from the container search algorithm, for efficiency of processing time.

The algorithm begins by first panning the side camera to position #1 as shown in FIG. 3c.

The camera is then panned towards position #2, at a constant speed. An image is saved into memory at pre-defined intervals, such as every 300-400 ms. The saved images will need to be processed in the next steps of the function, so they must be written into unused memory space and do not overwrite each other.

The system determines that the camera has reached position #2 by counting the number of images saved into memory. Each of the saved images is then passed into the chassis OCR engine. If the engine does not return a chassis code, then the next image is passed into the engine.

If a chassis code is returned from the engine, then the code is passed into the 'Chassis Code Validation' function (FIG. 6d). If the function does not return "correct", then the next image is passed into the engine, and the process is repeated.

If a "correct" chassis code is returned, then the index of the corresponding image is recorded, and the side camera is aimed at the location where the chassis code was found, using the 'Side Camera Relocation' function (see FIG. 6e).

The following parameters are pre-established and calibrated, prior to the utilization of this algorithm:
  a) The preset positions as shown in FIG. 3c;
  b) The number of images saved between position #1 and position #2;
  c) The timing between image saves; and,
  d) The pan speed of the side camera.

iv) Motion Detection #1 Algorithm

The Motion Detection #1 algorithm is called from the Container Code Search Algorithm with Camera Sensor. The objective of the Motion Detection #1 algorithm is to determine when a truck begins to pass underneath the rear camera, therefore entering a gate lane 104. In addition, the algorithm is used to determine when the truck has completed passing underneath the rear camera, taking into account the fact that the truck may come to a full stop below the camera.

The Motion Detection #1 Algorithm is presented in FIG. 6a. This function sets the rear camera pointing down, to Position #1 in FIG. 3b.

a) Image Capture

First, an image frame from the video stream is captured into lane server 122 memory.

b) Image Cropping

Next, in order to increase the motion sensor processing speed, the algorithm crops the original image in a predetermined location, with pre-determined size. The next motion detection steps use the cropped image only.

c) Low-Pass Filter

In order to further increase the processing speed and improve the sensor robustness, the lane server applies a 2-D low-pass filter to the cropped image. In an embodiment, the 2-D low-pass filter is a 5-by-5 average filter, which means that in the filtered image each pixel's value is the average of the neighboring pixels in the original image.

d) Down-Sample

The low-pass filtered image has less detail than the original image and can be down-sampled without losing information. The down-sampling process (in an embodiment) is simply choosing every other pixel (in x and y directions) as the output pixel. The output image has half size of the input image.

At this point a second thread is started. The original thread uses Frame Differencing to determine if the manipulated image is different from the previous image. The second thread uses Pattern Matching to compare the manipulated image to one stored in memory, when it is known that no truck is present. Both steps are described below:

e) Frame Differencing Motion Sensor

Compare the down-sampled image with the buffered previous frame image (for pattern matching, compare with the saved binary pattern image); count the number of different pixels. If the number of different pixels is bigger than some pre-determined threshold, this algorithm returns a Different="Y", and indicates that there is motion. Importantly, the image is then saved to a new location in memory, for use during the next pass.

f) Pattern Matching Motion Sensor

First all the image pixels are sorted by their grey level value, then the brightest N pixels in the image are "binarized" as "white", and the other pixels as "black" (assuming the reference pattern is brighter than the background). N is the number of pixels in the reference pattern. This algorithm returns a Match="No" when something (such as truck T) is blocking the camera's view of the reference pattern (described in more detail below), and a Match="Yes" when the reference pattern can be clearly seen. Unlike algorithms that use a fixed threshold, this adaptive thresholding algorithm is proven to be robust in different lighting and shadow. It even works in a partial shadow situation (in which there are different lighting conditions within the reference pattern).

This algorithm is also computationally simple and fast, which fits the need for real-time processing. As an additional speed enhancement, the value of N for the reference frame is counted during the sensor setup stage and saved in the setup file. A reference pattern such as a cross is painted on the ground (or otherwise applied) in the middle of position #1, FIG. 3b. Therefore, the reference pattern is expected to be identical to the current frame when no truck is within the field of view of position #1, and expected to be different from the current frame when a truck (including a chassis or container) is within the field of view of position #1.

The Motion Detection #1 algorithm returns a message indicating that "Motion is detected" when the Frame Differencing Sensor returns Different="Y" and the Pattern Matching Sensor returns Match="N". This algorithm also returns a message indicating that "No Truck is Present" when the Pattern Matching Sensor returns Match="Y", regardless of the value returned from the Frame Differencing Sensor. If the Frame Differencing Sensor returns Different="N", then the algorithm returns to the Image Capture step, if the algorithm has not yet returned a value.

The following parameters are pre-established and calibrated, prior to the utilization of this algorithm:

a) The preset position #1 as shown in FIG. 3b; and, b) A reference pattern is applied to the gate lane 104 such as painting a cross or other icon on the pavement, in the (preferably) center of the camera's field of view while at position #1, and this image needs to be identified in the program setup.

v) Motion Detection #2 Algorithm

The Motion Detection #2 algorithm is called from the Container Code Search Algorithm with Camera Sensor. The Motion Detection #2 algorithm is used to determine when the truck entering the gate lane has come to a complete stop.

The Motion Detection #2 algorithm is presented in FIG. 6b. This algorithm is a simplified version of Motion Detection #1 algorithm, performing all of the same steps, except it does not perform Pattern Matching. Instead, this algorithm relies entirely on Frame Differencing to determine if motion is present or not.

If a frame is determined to be different from the previous then motion is detected, the Frame Counter is set to 0, another frame is captured, and the procedure is repeated. If a frame is determined to be the same as the previous frame, then the Frame Counter is incremented. When the Frame Counter exceeds a threshold value, then it is determined that no motion is present, meaning the truck has come to a complete stop. Typically a Frame Counter threshold value of 3 (indicating 3 frames with no motion detected) is sufficiently robust.

The preset position #2 as shown in FIG. 3b are pre-established and calibrated using configuration software prior to the utilization of this algorithm.

vi) Cargo Type Determination Algorithm

The Cargo Type Determination algorithm is called from both modes of the Container Code Search Algorithm. The Cargo Type Determination algorithm is used to determine whether the truck within the gate lane is a bobtail, or is pulling bare chassis, or is pulling a container with a chassis. If the truck is pulling a container with a chassis, the function then determines whether the container between 20 feet and 40 feet in length, or 40 feet or greater (these numbers are consistent with current container sizes used in a preferred embodiment of the invention; it will be appreciated that the disclosed technique can also distinguish between any other container sizes, including more than two sizes).

The Motion Detection #1 Algorithm is presented in FIG. 6c. This function requires that the camera already be pointing to Position #2 in FIG. 3b, and that the truck be fully stopped, as determined by the Motion Detection #2 function.

a) Image Capture

First, an image frame from the video stream is captured into memory.

b) Image Cropping

Next, in order to increase the motion sensor processing speed, the image is cropped in a pre-determined location, with pre-determined size. The next steps are based on the cropped image only.

c) Low-Pass Filter

In order to further increase the processing speed and improve the sensor robustness, a 2-D low-pass filter is applied to the cropped image. The 2-D low-pass filter uses (in an embodiment) a 5×5 average filter, which means that in the filtered image each pixel's value is the average of the neighboring pixels in the original image.

d) Adaptive Thresholding

Adaptive Thresholding is useful for extracting the edges in the image. The algorithm first performs adaptive thresholding using a 7×7 mask, by taking a grayscale or color image as input and, in the simplest implementation, outputting a binary image representing the segmentation. The rest of this section describes the details of the adaptive thresholding algorithm, in a preferred embodiment. One will appreciate that other processing techniques could also be used and other techniques as known in the art constitute part of the invention.

1. The algorithm defines a 7×7 filter mask, i.e.

| 1/49 | 1/49 | 1/49 | 1/49 | 1/49 | 1/49 | 1/49 |
|------|------|------|------|------|------|------|
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |
| 1/49 | 1/49 | 1/49 | 1/49 | 1/49 | 1/49 | 1/49 |

2. In each scan of the input image, the algorithm takes a window of size 7×7 pixels, multiplies each of the pixels with the corresponding filter weight, adds all of them and outputs the value, and stores the results in the same position as in the input image. The following mathematical operation is performed on the image:

$$\text{output1}[m, n] = \sum_{j=0}^{J-1} \sum_{k=0}^{K-1} \text{filter\_mask}[j, k] * \text{image}[m - j, k - n]$$

where:

output1 is the intermediate stage to store the result of the above operation filter_mask is the 7×7 mask image is the input grayscale image This is performed as many times as necessary to process all pixels in the image.

3. Subtract output1 from the input image and store in avg1 variable, i.e. subtract each pixel of output1 with the corresponding pixel of the input image. This is called a pixel to pixel operation.

$$\text{avg1}[m, n] = \text{image}[m, n] - \text{output1}[m, n]$$

4. The value 8 is added to each pixel of avg1. (Through experimentation, this value was found to reduce unwanted edges in the image.)

5. The threshold is set to 0. Any pixel above the threshold is set to white, and any pixel below the threshold is set to black. The resulting binary image is the output of the adaptive thresholding algorithm.

e) Morphological Filter

Next, two separate morphological closing processes are performed, each on a separate copy of the binary image. Morphological closing consists of a dilation followed by an erosion. In this case, closing is performed to eliminate unwanted portions of the image. The following two paragraphs describing dilation and erosion are taken from the Hypermedia Image Processing Reference, copyright 2002 by Robert Fisher, Simon Perkins, Ashley Walker and Erik Wolfart (http://homepages.inf.ed.ac.uk/rbf/HIPR2/). "To compute the dilation of a binary input image by this structuring element, each of the background pixels in the input image is considered in turn. For each background pixel (input pixel), the structuring element is superimposed on top of the input image so that the origin of the structuring element coincides with the input pixel position. If at least one pixel in the structuring element coincides with a foreground pixel in the image underneath, then the input pixel is set to the foreground value. If all the corresponding pixels in the image are background, however, the input pixel is left at the background value.

"To compute the erosion of a binary input image by this structuring element, each of the foreground pixels in the input image is considered in turn. For each foreground pixel (input pixel), the structuring element is superimposed on top of the input image so that the origin of the structuring element coincides with the input pixel coordinates. If for every pixel in the structuring element, the corresponding pixel in the image underneath is a foreground pixel, then the input pixel is left as it is. If any of the corresponding pixels in the image are background, however, the input pixel is also set to background value."

Closing is performed on Image H using a horizontal structuring element, such that the processed image contains only horizontal lines. Closing is performed on Image V using a vertical structuring element, such that the processed image contains only vertical lines. The two resulting images are stored in memory.

f) Labeling

The purpose of Labeling is to label each object in each image (V and H) with a unique number. In the binary image, the background is white (i.e. 1) and pixels representing an object are black (i.e. 0).

In each scan of the image, the labeling algorithm labels only one object, so the image is recursively scanned until the variable bFound becomes 0. The rest of this section describes the details of the labeling algorithm.

*Define the variable bFound as 1. While bFound is equal to 1, set number of objects to 0.

1. Set variable bFound to 0. Set variable flag to 0. Begin the search for a black pixel in the binary image, starting from the top left pixel. If no black pixels are found, then value of bFound remains 0, and the number of objects is returned. When the first black pixel is found, set bFound to 1, and label the black pixel with a unique label (e.g. 2). Also label any of its neighbors which are black pixels. Neighboring pixels are defined as shown below, where 'x' represents the black pixel, and the empty boxes represent neighboring pixels.

Set variable flag to 1.

2. When variable flag=1, instead of finding the black pixel, find the unique label assigned to the first black pixel so that all connected black pixels can be labeled with the same number. (The term connected black pixels is used to describe a set of black pixels that are all adjacent to one another within the image.)

3. To ensure that any connected black pixels to the left of the first black pixel found are also labeled, scan the image from right to left starting with the top right pixel, and label any connected black pixels found.

4. When all connected black pixels in the object have been labeled, increment the unique label by 1. Since bFound=1, repeat step 1.

When bFound=0, exit the scanning of the image and return the number of objects found.

The number of times the image will be scanned is equal to number of objects in the image.

For example, suppose the input image is:

| 1 | 1 | 1 | 1 | 1 | 1 | 1 | 1 | 1 | 1 |
|---|---|---|---|---|---|---|---|---|---|
| 1 | 1 | 0 | 0 | 0 | 1 | 1 | 1 | 1 | 1 |
| 1 | 0 | 0 | 0 | 0 | 0 | 1 | 1 | 0 | 0 |
| 1 | 1 | 1 | 1 | 1 | 1 | 1 | 1 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 0 | 0 | 0 | 0 | 1 | 1 | 1 | 1 | 1 |
| 1 | 0 | 0 | 0 | 0 | 1 | 1 | 1 | 1 | 1 |
| 1 | 0 | 0 | 0 | 0 | 1 | 1 | 1 | 1 | 1 |
| 1 | 0 | 0 | 0 | 0 | 0 | 1 | 1 | 1 | 1 |

The output image will be:

| 1 | 1 | 1 | 1 | 1 | 1 | 1 | 1 | 1 | 1 |
|---|---|---|---|---|---|---|---|---|---|
| 1 | 1 | 2 | 2 | 2 | 1 | 1 | 1 | 1 | 1 |
| 1 | 2 | 2 | 2 | 2 | 2 | 1 | 1 | 3 | 3 |
| 1 | 1 | 1 | 1 | 1 | 1 | 1 | 1 | 3 | 3 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 4 | 4 | 4 | 4 | 1 | 1 | 1 | 1 | 1 |
| 1 | 4 | 4 | 4 | 4 | 1 | 1 | 1 | 1 | 1 |
| 1 | 4 | 4 | 4 | 4 | 1 | 1 | 1 | 1 | 1 |
| 1 | 4 | 4 | 4 | 4 | 4 | 1 | 1 | 1 | 1 | g) Area and Location

A set of coordinates for each line is determined as follows:

Start from Top-Left and scan the whole image and find the relative location of each object and store the location in a variable, in terms of x and y coordinates from that corner.

Start from Top-Right and scan the whole image and find the relative location of each object and store the location in a variable, in terms of x and y coordinates from that corner.

Start from Bottom-Left and scan the whole image and find the relative location of each object and store the location in a variable, in terms of x and y coordinates from that corner.

Start from Bottom-Right and scan the whole image and find the relative location of each object and store the location in a variable, in terms of x and y coordinates from that corner.

The area is calculated for each line by first determining the line's width and height, based upon the coordinates calculated above, and then simply multiplying width by height.

In addition, by examining each line's coordinates, it can be determined where the line lies, in relation to the entire image. For example, it can be determined which lines lie in the upper part of the image, which lines lie in the middle, etc. These values are required for the last part of the algorithm, as explained below.

h) Combination Decision Logic

Next, the variables n0, n1, td, tc, and th are calculated as follows:

n0: number of objects in image V n1: number of objects in image H td=count of number of lines of area greater than variable 'a' (where variable 'a' is an empirically-determined threshold intended to identify the target item) and lies on the upper part of the image V and lies near the middle of the image V.

tc=count of number of lines of area greater than variable 'a' (where variable 'a' is an empirically-determined threshold intended to identify the target item) and lies on the lower part of the image V and lies near the middle of the image V.

th=count of number of lines located near middle of the image H and is greater than a length 'l'

Note: The lower part and upper part are decided empirically and the middle area from left and right are decided empirically.

The algorithm then makes the Cargo Type Determination as follows:

If td==0 and tc==0 and th<10 then a bobtail is present

If n0<2 then an error has occurred

If th>20 then a bare chassis is present

Else, a container is present:
 td>tc then the container is 40 ft in length or greater
 Else, the container is 20 ft in length The preset position #2 as shown in FIG. 3b are pre-established and calibrated prior to the utilization of this algorithm.

vii) Chassis Code Validation Algorithm

The Chassis Code Validation algorithm is called from the Chassis Code Search Algorithm. The Chassis Code Validation algorithm is used to determine whether a specific chassis code is valid by comparing against a list of specific chassis codes previously set up within the TOS.

The Chassis Code Validation Algorithm is presented in FIG. 6d. This function receives a potential chassis code, and returns "Correct" or "Can Not Match". The following special searches are used within this algorithm:

Binary Search

In order to improve the processing speed, the total chassis strings list is sorted and a binary search algorithm searches for the OCR result in the list. The basic idea of the binary search is: for a sorted list, first compare the middle record with the searching record, if the middle record is larger than the searching record, next time only search in the lower half of the list, vice versa. Using this method, search time is reduced because only the portion of the list most likely to contain the result is searched. The average searching time of the binary search algorithm is $\log_2 N$, where N is the size of the list.

Edit Distance

When there is no single record in the total list can perfectly match the OCR result, we will try to use "edit distance" to find a most likely match in the list. The definition of "edit distance" is: The smallest number of insertions, deletions, and substitutions required to change one string into another, also known as Levenshtein distance.

There are many algorithm implementations available to calculate Levenshtein distance.

A preferred embodiment uses the algorithm from http://www.merriampark.com/ld.htm (Merriam Park Software) to search the total chassis list for record with edit distance of 1 (or other threshold number) to the searching OCR result.

The list of chassis codes is pre-established prior to the utilization of this algorithm.

viii) Side Camera Relocation Algorithm

The Side Camera Relocation algorithm is called from the Chassis Code Search Algorithm. The Side Camera Relocation algorithm is used to pan the side camera back to the camera viewing position where the image containing the chassis code was found. This allows the clerk to view the chassis code and use it to verify the OCR result. Without this feature, the clerk would have to manually aim the camera to find the chassis code in order to verify the OCR result.

The Lane Server first sends instructions to move the Side Camera to Position #1 (FIG. 3c). It then obtains the index of the image that produced an OCR result verified as 'Correct' by the Chassis Code Validation function. Next, the Lane Server sends instructions to pan the camera towards position #2 for a time period equal to the image index multiplied by the predefined time interval at which images were recorded by the Chassis Code Search Algorithm. Since the camera pans at a fixed rate of speed, the result of panning for this time interval is that the camera is aimed to the same camera viewing position as when the OCR image was created. When the camera reaches this position, it remains there until the Chassis Code Search Algorithm is invoked again.

The Side Camera Relocation Algorithm is presented in FIG. 6e.

The invention claimed is:

1. A method for determining a container code on a container and a chassis code on a chassis, the container and chassis being associated with a truck, comprising:
   detecting when the truck has passed a first camera and the truck has stopped;
   with the first camera at a preset position for a wide view of the truck, determining whether the container is present, and if so, whether it is a first size or a second size;
   if the container is the first size, setting the first camera to a first preset position appropriate for viewing a first size container;
   if the container is the second size, setting the first camera to a second preset position different from said first preset position appropriate for viewing a second size container;
   taking an image of the container with the first camera; and
   passing the image to an OCR engine, which determines the container code.

2. The method of claim 1, wherein the step of detecting when the truck has passed a first camera uses an external trigger.

3. The method of claim 2, wherein the external trigger is a camera sensor, or a gatepass signal, or a push button signal, or a card reader signal.

4. The method of claim 1, wherein the step of detecting when the truck has passed the first camera and has stopped is accomplished by (i) when the first camera is in a first viewing position suitable for viewing the truck as the truck moves past the first camera, this position differing from either the preset position for viewing a wide view of the truck or the preset positions appropriate for viewing the first size container and the second size container, taking a series of images of the truck with the camera, and comparing the images in the series of images with each other, and also by comparing the images in the series of images with a reference image, and finding that the truck has stopped when images are similar enough to each other to indicate no motion and to indicate that the camera views the reference image, and then (ii) moving the camera view to the preset position for viewing a wide view of the truck.

5. The method of claim 4, wherein the step of detecting when the truck has passed the first camera and has stopped further comprises, after the moving the camera view to the preset position for viewing a wide view of the truck, determining that that truck has stopped by taking a series of images of the truck with the first camera and comparing the images in the series with each other.

6. The method of claim 5, further comprising passing at least some of the images of the truck taken with the camera the first camera is in a first position suitable for viewing the truck as the truck moves past the first camera to the OCR engine.

7. The method of claim 6, wherein at least some of the images passed to the OCR engine taken with the camera in the position suitable for viewing the truck as the truck moves past the first camera are considered by the OCR engine both flipped and un-flipped.

8. The method of claim 4, wherein comparing the images in the series of images with a reference image includes binarizing an image in the series and comparing that image with a reference image, which is also binarized.

9. The method of claim 8, wherein binarizing the image in the series comprises taking the N brightest pixels as white and the remaining pixels as black, wherein N is based on the number of white pixels in the binarized reference image.

10. The method of claim 8, wherein the reference image is based on an image of an icon applied to a gate lane over which the truck passes.

11. The method of claim 1, wherein the step of determining whether the container is present, and if so, whether it is a first size or a second size comprises taking an image of the truck with the camera in the preset position for viewing a wide view of the truck, performing separate morphological closing operations on two copies of that image, one with a horizontal structuring element and one with a vertical structuring element, to create a horizontal image and a vertical image, finding the number of lines in the horizontal image and the vertical image, finding the area and location of the horizontal lines and the vertical lines, and applying decision logic to determine if a chassis present, if a container is present, and if a container if present, whether it is of the first size or the second size.

12. The method of claim 1, wherein if a chassis is present, determining the chassis code with a second camera.

13. The method of claim 12, where the chassis code is determined by taking a series of images as the second camera pans in a direction corresponding to a direction that the truck is moving, and passing the images to a chassis OCR engine.

14. The method of claim 13, further comprising the step of validating the chassis code by comparing the chassis code as determined by the OCR engine with a preset list of chassis codes, and doing a binary search which compares an prefix of the chassis code as determined by the OCR engine.

15. The method of claim 1, wherein the first camera is mounted in a position above the height of the truck.

16. A method for determining a container code and a chassis code associated with a truck, comprising:
  viewing the truck with a rear camera as the truck passes beneath the rear camera, the rear camera focusing on a position pointing down, the viewing generating a series of images,
  collecting data from the rear camera and passing it to an OCR engine,
  determining when the truck has completely passed beneath the rear camera by at least one of (a) comparing the camera view with a reference view that is obscured when the truck is beneath the camera, and (b) comparing the series of images with each other and determining they are equivalent;
  changing the rear camera view to a second position and collecting a second series of images at this second position;
  determining that the truck has stopped by comparing the second series of images with each other determining they are equivalents;
  determining whether the container is a first size or a second size by analyzing at least some of the second series of images; and
  changing the rear camera view to a third position if the container is the first size and to a fourth position if the container is the second size.

17. A method for automatically locating indicia on a truck, chassis, and container, comprising the steps of:
  presetting a camera to a first viewing position to learn more about the truck, chassis, or container;
  analyzing the view from the camera in the first viewing position; and
  depending upon that view, automatically changing the camera to another viewing position from which the camera can view the indicia.

18. A method for auto-locating the container and chassis code associated with a truck located in a gate lane at an intermodal terminal, comprising:
  a) Detecting that a truck has entered the gate lane;
  b) Detecting that said truck is stationary;
  c) Determining the type of cargo that is associated with said truck;
  d) Auto-positioning a rear camera to view the container code; and
  e) Auto-positioning a side camera to view the chassis code.

19. A system for determining a container code on a container and a chassis code on a chassis, the container and chassis being associated with a truck, comprising:
  a first camera and software for the first camera for detecting when the truck has passed the first camera and the truck has stopped;
  means for determining whether the container is present, and it so, whether it is a first size or a second size;
  means for setting the first camera to first preset position appropriate for viewing a first size container if the container is the first size, and for setting the first camera to a second preset position different from the first preset position appropriate for viewing a second size container if the container is the second size;
  means for taking an image of the container with the first camera; and
  means for passing the image to an OCR engine, which determines the container code.

* * * * *